UNITED STATES PATENT OFFICE 2,106,703

MIXED ESTER DERIVATIVES OF GLYCOL

Henry L. Cox and Thomas F. Carruthers, South Charleston, W. Va., assignors to Union Carbide and Carbon Corporation, a corporation of New York No Drawing. Application May 8, 1934,
Serial No. 724,622

6 Claims. (Cl. 260—106)

The invention relates to new mixed ester derivatives of glycol, and compositions of matter containing the same. It has particular reference to the chemical compounds formed by the further esterification, with an aliphatic monobasic acid, of primary esters resulting from the reaction of a glycol and a dibasic aliphatic acid.

Condensation polymers of resinous nature have heretofore been made by the interaction of a dihydric alcohol and a dibasic acid. Ethylene glycol succinate is a typical ester of this type, which may be formed by heating ethylene glycol with succinic acid. It has also been shown that these reacting ingredients will build up into chain-like molecular aggregates, having at each end of the chain hydroxyl or carboxyl groups, depending upon whether the alcohol or acid respectively are in excess during the reaction. The actual molecular size of the resulting compound may be controlled to a certain extent by variation in the reacting conditions, but the interest of the prior art in these esters has been centered primarily in those of a molecular weight of 2300 or higher, which is sufficient to form resins of the alkyd type. Attempts have been made to further esterify, or acetylate, these resins, in an effort to make them more stable, and prevent a tendency toward further polymerization after they have been originally formed. These efforts have, however, been unsuccessful, and it is the opinion of those skilled in the art that the hydroxyl or carboxyl groups forming the terminals of the molecular chain are quite unsusceptible of further reaction.

The mixed esters of the present invention are of similar chain-like structure, but we have found that the primary ester may be further esterified to replace the end hydroxyl groups with an acid radical. It has also been determined that esterification with a monobasic acid can be effected at any point in the primary reaction, so as to limit the length of the chain, and the subsequent molecular weight of the final ester, as desired. A new group of mixed esters are thus provided, preferably of a lower molecular weight than that required for an actual resin, which have stability and other properties of value as plasticizers and solvents for cellulose derivatives and other common ingredients of plastic coating and impregnating compositions.

In the preparation of the new esters, a reaction of two steps is involved. The primary ester is first formed by heating a dibasic acid with an excess of the dihydric alcohol. This compound may be represented by the structural formula:

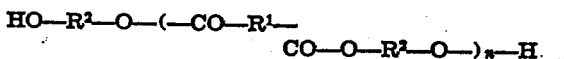

in which $R^1$ represents an alkylene group or a simple bond, $R^2$ is the radical of an alkylene or polyalkylene glycol, and the value of $n$ is at least 2. When polymerization in this reaction has progressed to the stage where $n$ has reached the desired value, which fact may be determined from the time of reaction and other conditions, a monobasic acid or anhydride is added to the reaction mixture. The end hydroxyl groups of the chain are thus replaced with an acid radical, and further polymerization is arrested. The resulting mixed ester may be shown by the following structural formula:

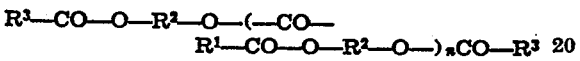

in which $R^1$, $R^2$ and $n$ are similar to the first formula, and $R^3$ represents an alkyl group. This latter formula will indicate the esters which are intended to be included within the scope of this invention.

Succinic acid is preferred in forming the primary ester, and may be reacted with ethylene glycol, or any of the polyglycols. Oxalic, adipic, or other saturated dibasic acids of this series may likewise be substituted for succinic acid. Acetic acid is especially appropriate for the final esterification, although propionic, butyric, or other monobasic aliphatic acid, or its anhydride, may also be used. Ethylene glycol succinate acetate is typical of the completed mixed ester, and in accordance with the above structural formula, may be indicated as

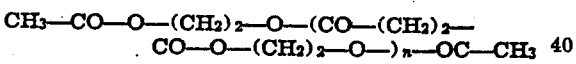

This compound has been prepared in at least three different molecular weights, in which the repeated structural unit (the value of $n$) occurs 8, 5, and 3 times, respectively. With any combination of reagents mentioned, the value of $n$ is preferably no higher than 10.

The following three examples are illustrative of the specific manner in which certain of the esters may be prepared.

Example 1

Ethylene glycol in the amount of 186 grams was reacted with 236 grams of succinic acid by heating in the presence of 0.2 gram of sulfuric acid, at a temperature of 140° C. and a pressure of 350 mm. The reaction was continued for one hour, and 82 grams of water were removed. 435 grams of acetic anhydride were then added, and heating was continued for another hour at 100° to 110° C. Water and unreacted acetic acid and acetic anhydride were removed by distillation. The resulting wax-like material, which may be termed ethylene glycol succinate acetate was purified, and its molecular weight determined to be 1,340. It was insoluble in water.

*Example 2*

A mixture of 1350 grams of triethylene glycol and 710 grams of succinic acid was reacted in the presence of 0.5 gram of sulfuric acid, by heating for 1¼ hours under 100 mm. pressure up to a temperature of 141° C. Water in an amount of 210 grams was removed during the reaction. To this reaction product 300 grams of acetic anhydride were added. The heat of reaction raised the temperature of the mixture to 70° C., and it was then heated to 130° C. for one hour. Excess acetic anhydride and acid were removed by distilling under reduced pressure. The final product, triethylene glycol succinate acetate, was a thick, viscous liquid, soluble in acetone and water, and insoluble in ether.

*Example 3*

Succinic acid and diethylene glycol in the amount of 11.7 mols and 12.3 mols respectively were heated until the temperature reached 180° C. at 15 mm. pressure. 2.5 mols of acetic anhydride were added, and the mixture was then heated for two hours at 120° C. Excess anhydride was removed by distillation at 180° C. and 15 mm. The resulting product, diethylene glycol succinate acetate, was a wax-like material.

In the above Examples 2 and 3, the actual molecular weight of the final product was not determined, but with these reacting ingredients, it was readily apparent that the product could be varied in molecular weight between about 1000 and 2000, according to the temperature and time of reaction employed, and the amount of water removed.

As previously mentioned, the esters of this invention have properties excellently adapting them for use as plasticizers. Products varying from viscous liquids to waxes may be obtained, by variation in the reacting ingredients, as well as the conditions under which the reaction is maintained. Those of solid character as originally formed have comparatively low melting points, and both the wax-like and liquid esters have a very good solvent power for cellulose derivatives, and many of the natural and synthetic resin and gums employed in plastic compositions, useful for films, molded articles and the like. A very soft and plastic clear film is, for example, obtained by dissolving equal parts of diethylene glycol succinate acetate (molecular weight 1950) and regular lacquer type nitrocellulose in any of the usual lacquer solvent mixtures. Similar clear films may also be prepared using 80 parts of acetone-soluble cellulose acetate, and 20 parts of the above plasticizer. Other of the mixed esters described are equally useful, and their most suitable proportions as plasticizers with other plastic ingredients may be readily determined by those skilled in the art.

We claim:

1. As chemical compounds, mixed esters having the structural formula

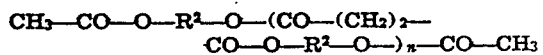

in which $R^2$ is a radical of a member of the group consisting of alkylene and polyalkylene glycols, and the value of $n$ is from 2 to 10 inclusive.

2. As a chemical compound, ethylene glycol succinate acetate having the structural formula

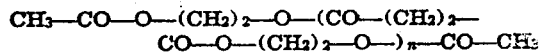

in which the value of $n$ is from 2 to 10 inclusive.

3. As a chemical compound, diethylene glycol succinate acetate having the structural formula

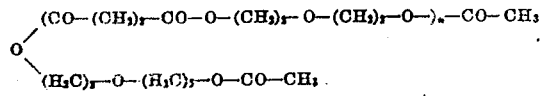

in which the value of $n$ is from 2 to 10 inclusive.

4. As a chemical compound, triethylene glycol succinate acetate having the structural formula

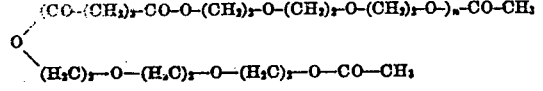

in which the value of $n$ is from 2 to 10 inclusive.

5. As chemical compounds, mixed esters having the structural formula

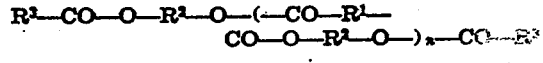

in which $R^1$ represents an alkylene group, $R^2$ is a radical of a member of the group consisting of alkylene and polyalkylene glycols, $R^3$ represents a lower alkyl group, and the value of $n$ is from 3 to 8 inclusive.

6. As chemical compounds, mixed esters having the structural formula

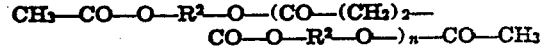

in which $R^2$ is a radical of a polyalkylene glycol, and the value of $n$ is from 2 to 10 inclusive.

HENRY L. COX.
THOMAS F. CARRUTHERS.